(12) United States Patent
Wu et al.

(10) Patent No.: US 7,548,671 B2
(45) Date of Patent: Jun. 16, 2009

(54) OPTICAL DEVICE INCLUDING WAVEGUIDE GRATING STRUCTURE

(75) Inventors: Wei Wu, Mountain View, CA (US); David Fattal, Mountain View, CA (US); Charles Santori, Sunnyvale, CA (US); Robert N. Bicknell, Corvallis, OR (US); Shih-Yuan Wang, Palo Alto, CA (US); R. Stanley Williams, Palo Alto, CA (US); Nathaniel J. Quitoriano, Pacifica, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 11/879,242

(22) Filed: Jul. 16, 2007

(65) Prior Publication Data

US 2009/0022448 A1  Jan. 22, 2009

(51) Int. Cl.
*G02B 6/34* (2006.01)
(52) U.S. Cl. .............................. 385/37; 372/10; 385/12
(58) Field of Classification Search .................. 385/37, 385/12, 10; 372/102
See application file for complete search history.

(56) References Cited

U.S. PATENT DOCUMENTS

| | | | |
|---|---|---|---|
| 5,781,670 A | 7/1998 | Deacon et al. | |
| 6,035,089 A | 3/2000 | Grann et al. | |
| 6,218,194 B1 * | 4/2001 | Lyndin et al. | 436/518 |
| 6,757,463 B2 | 6/2004 | Hutchinson et al. | |
| 6,829,067 B2 | 12/2004 | Psaltis et al. | |
| 6,999,156 B2 | 2/2006 | Chou et al. | |
| 7,009,680 B2 | 3/2006 | Cavanaugh et al. | |
| 7,013,064 B2 | 3/2006 | Wang | |
| 7,058,261 B2 * | 6/2006 | Ghiron et al. | 385/36 |
| 7,167,615 B1 | 1/2007 | Wawro et al. | |
| 7,269,308 B2 * | 9/2007 | Tono et al. | 385/12 |
| 2002/0141063 A1 | 10/2002 | Petrov et al. | |
| 2004/0120644 A1 | 6/2004 | Chou et al. | |
| 2005/0094939 A1 * | 5/2005 | Ghiron et al. | 385/36 |

(Continued)

FOREIGN PATENT DOCUMENTS

WO  02-091040 A2  11/2002

OTHER PUBLICATIONS

Hegedus, Z., et. al., "Low Sideband Guided-Mode Resonant Filter," Applied Optics, vol. 39, No. 10, pp. 1469-1473 (Apr. 1, 2000).

(Continued)

*Primary Examiner*—Ellen Kim

(57) ABSTRACT

Optical devices including waveguide grating structures are described. In accordance with one embodiment, an optical device is provided comprising a horizontal waveguide grating structure having at least one waveguiding layer and at least one subwavelength periodic grating layer. The optical device further comprises upper and lower cladding layers immediately adjoining respective upper and lower surfaces of the waveguide grating structure and having refractive indices lower than a lowest-index one of the waveguiding layers, incident radiation propagating through one of the upper and lower cladding layers toward the waveguide grating structure. The waveguide grating structure is configured for peak reflection of the incident radiation at a peak reflection frequency. A cumulative thickness of the waveguiding layers is less than one tenth of a free space wavelength of the incident radiation at the peak reflection frequency divided by an average refractive index of the waveguiding layers.

20 Claims, 5 Drawing Sheets

U.S. PATENT DOCUMENTS

2007/0071061 A1 3/2007 Pietra et al.
2007/0081758 A1* 4/2007 Tono et al. .................... 385/12

OTHER PUBLICATIONS

Katchalski, T., et. al., "Light Modulation with Electro-Optic Polymer-Based Resonant Grating Waveguide Structures," Optics Express, vol. 13, No. 12, pp. 4645-4650 (Jun. 13, 2007).

Tan, H., et. al., "A Tunable Subwavelength Resonant Grating Optical Filter" [online], [retrieved May 18, 2007] <URL:http://www.princeton.edu/~sbai/research/TunableFilter.pdf>.

Rabady, Rabi, et. al., "Fabrication Methods of Optical Resonant Filters With a Close-to Rectangle Filtering Profile," Applied Optics, vol. 43, No. 5, Feb. 2004, pp. 1114-1120.

Thurman, Samuel, et. al., "Controlling the Spectral Response in Guided-Mode Resonance Filter Design," Applied Optics, vol. 42, No. 16, Jun. 2003, pp. 3225-3233.

International Search Report, PCT Patent Application No. PCT/US2008/008715, filed Jul. 16, 2008; search issued by Korean Patent Office (ISA) Feb. 24, 2009.

* cited by examiner

OPTICAL DEVICE INCLUDING WAVEGUIDE GRATING STRUCTURE

FIELD

This patent specification relates to optical devices. More particularly, this patent specification relates to optical devices that include waveguide grating structures for providing capabilities such as filtering of an incident optical signal and modulation of an incident optical signal.

BACKGROUND

Devices for altering the propagation of electromagnetic radiation, such as by filtering and modulation, represent fundamental building blocks for many technological endeavors. Filtering refers generally to the selective treatment of electromagnetic radiation, such as selective transmission or reflection, based on frequency of the electromagnetic radiation. Modulation refers generally to the timewise variation of a property of an electromagnetic wave or signal, such as amplitude, frequency, phase, etc., according to a time varying control signal or modulation signal. Optical filtering and optical modulation refer to the filtering and modulation, respectively, of electromagnetic radiation at optical frequencies, which can include infrared, visible, and ultraviolet frequencies.

For certain electrooptical or all-optical applications there is sometimes a need for an optical filter exhibiting a very narrow reflection band centered near a specific frequency, while also exhibiting a flat, low-loss transmission band at other frequencies including nearby frequencies. By way of example, there may be a goal of separating out a particular mode from the output beam of a semiconductor laser source, and that mode might only be separated from nearby modes by as little as 1 nm or less (i.e., separated by a frequency difference corresponding to a free-space wavelength difference of 1 nm or less). A flat, low-loss transmission band can be particularly important if an application requires multiple such optical filters to be placed in optical series with each other.

With regard to optical modulation, the feasibility or desirability of a particular optical modulator for a particular application can often depend not only upon how well a target optical frequency range is modulated by that optical modulator, but also upon how well non-target frequencies are not modulated (or otherwise perturbed) by that optical modulator. Thus, for example, it may be desirable for an optical modulator to provide effective ON-OFF modulation for a first optical frequency $f_1$ responsive to a modulation control signal, while allowing nearby optical frequencies $f_0$ and $f_2$ to pass through unperturbed, with little or no attenuation and no timewise relationship to the modulation control signal.

More generally, practical issues often arise in the implementation of at least one of optical filters and optical modulators in regard to one or more of modulation speed, frequency selectivity, spectral range of operation, noise performance, device cost, heat dissipation, device size, device tunability, and device power consumption. Other issues arise as would be apparent to one skilled in the art in view of the present disclosure.

SUMMARY

In one embodiment, an optical device is provided, comprising a horizontal waveguide grating structure having at least one waveguiding layer and at least one subwavelength periodic grating layer. The optical device further comprises upper and lower cladding layers immediately adjoining respective upper and lower surfaces of the waveguide grating structure and having refractive indices lower than a lowest-index one of the waveguiding layers, incident radiation propagating through one of the upper and lower cladding layers toward the waveguide grating structure. The waveguide grating structure is configured for peak reflection of the incident radiation at a peak reflection frequency. A cumulative thickness of the waveguiding layers is less than one tenth of a free space wavelength of the incident radiation at the peak reflection frequency divided by an average refractive index of the waveguiding layers.

Also provided is a method comprising causing an optical apparatus to be positioned in the path of incident electromagnetic radiation, the optical apparatus comprising a horizontal waveguide grating structure having at least one waveguiding layer and at least one subwavelength periodic grating layer. The optical apparatus further comprises upper and lower cladding layers immediately adjoining respective upper and lower surfaces of the waveguide grating structure and having refractive indices lower than a lowest-index one of the waveguiding layers. Incident radiation propagates in a generally downward direction toward the waveguide grating structure through the upper cladding layer. The method further comprises receiving one of radiation reflected upwardly from the waveguide grating structure through the upper cladding layer and radiation propagated downwardly through the waveguide grating structure and the lower cladding layer. The waveguide grating structure is configured for peak upward reflection of the incident radiation at a peak reflection frequency. A cumulative thickness of the waveguiding layers is less than one tenth of a free space wavelength of the incident radiation at the peak reflection frequency divided by an average refractive index of the waveguiding layers.

Also provided is an apparatus, comprising an optical source providing a source beam and a horizontal waveguide grating structure comprising at least one waveguiding layer and at least one subwavelength periodic grating layer. The waveguide grating structure has upper and lower surfaces defined by an uppermost one and a lowermost one of the waveguiding and subwavelength periodic grating layers, respectively, and the waveguide grating structure is disposed beneath the optical source. The upper and lower cladding layers extend upward from the upper surface and downward from the lower surface, respectively, and have refractive indices lower than a lowest-index one of the waveguiding layers, and the upper cladding layer is disposed beneath the optical source. The apparatus further comprises an optical receiver positioned to receive one of radiation reflected upwardly from the waveguide grating structure through the upper cladding layer and radiation propagated downwardly through the waveguide grating structure and the lower cladding layer. The waveguide grating structure is configured for peak reflection of the source beam at a peak reflection frequency. A cumulative thickness of the waveguiding layers is less than one tenth of a free space wavelength of the source beam at the peak reflection frequency divided by an average refractive index of the waveguiding layers.

DETAILED DESCRIPTION

Figure 1A:
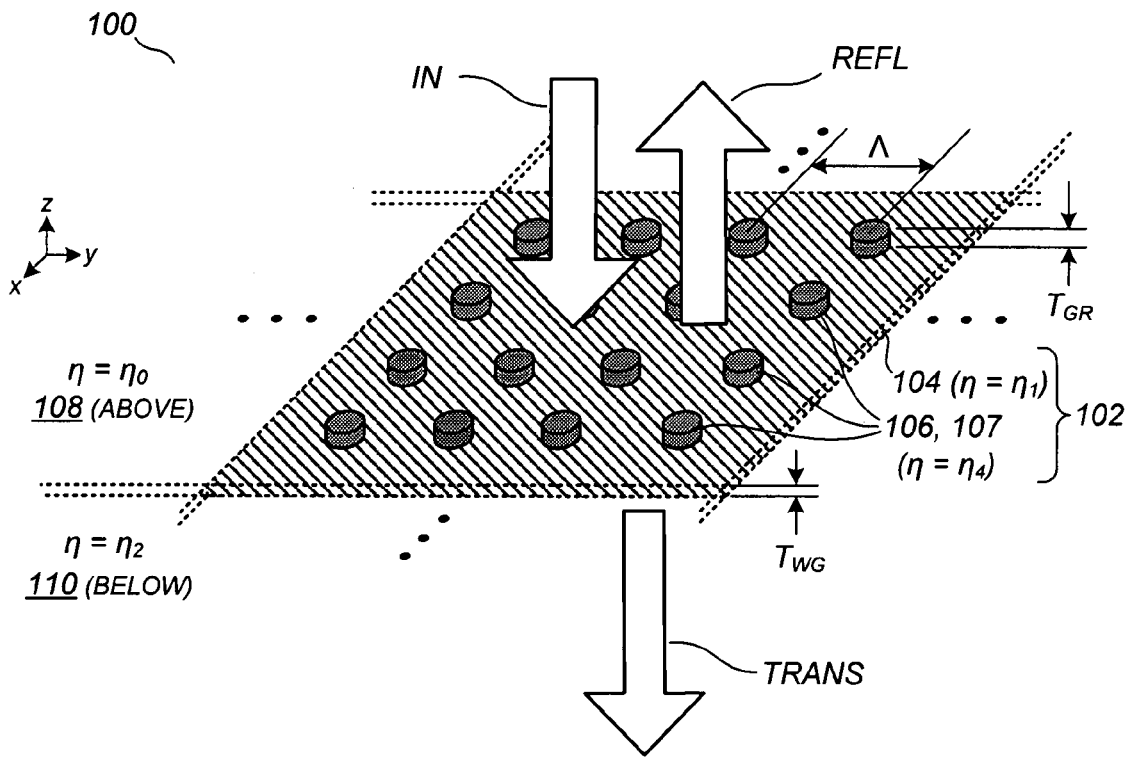
FIG. 1A illustrates a perspective view of an optical device according to an embodiment.

FIG. 1A illustrates a perspective view of an optical device 100 according to an embodiment. Optical device 100 comprises a horizontally oriented waveguide grating structure (WGS) 102 comprising a waveguiding layer 104 and a subwavelength periodic grating layer 106 having a periodic pattern of defects 107. As shown in FIG. 1A, the waveguiding layer 104 has a thickness $T_{WG}$ and the subwavelength periodic grating layer 106 has a thickness $T_{GR}$. Optical device 100 further comprises an upper cladding layer 108 immediately above the WGS 102, and a lower cladding layer 110 immediately below the WGS 102.

Incident radiation (IN) propagates in a generally downward direction from a source (not shown) through the upper cladding layer 108 on its way to the WGS 102. Depending on the radiation frequency and other aspects of the optical apparatus 100 described further herein, that radiation can be reflected upward to result in reflected radiation (REFL) and/or can continue propagating downward to result in transmitted radiation (TRANS). It is to be appreciated that the terms horizontal and vertical, and related terms such as upward and downward, are used herein to provide a readily understandable reference frame for clear description of the embodiments, and are not intended to convey an absolute orientation relative to gravity or other external frames of reference.

As used herein, defect refers to a localized variation in a radiation-affecting property of a material layer, such as its refractive index, which can be brought about in any of a variety of known ways including localized insertions of different materials into the layer, localized removal of material from a layer, and localized processing that changes material properties. A grating is formed by a spatial pattern of defects in a layer. In the example of FIG. 1A, the subwavelength periodic grating layer 106 consists of the island-like defects 107 as inserted into a layer of material that is the same type of material used in upper cladding layer 108, the island-like defects 107 defining a two-dimensional grating pattern. In other embodiments, the defects can be linear to form a one-dimensional grating pattern.

As illustrated in FIG. 1A, the upper cladding layer 108 has a refractive index $\eta_0$, waveguiding layer 104 has a refractive index $\eta_1$, lower cladding layer 110 has a refractive index $\eta_2$, and the defects 107 have a refractive index $\eta_4$. In accordance with functionality as a guided mode resonance (GMR) filter, alternatively referenced as a subwavelength resonant grating (SRG) filter, the refractive index $\eta_1$ of waveguiding layer 104 should be greater than both the refractive index $\eta_0$ of upper cladding layer 108 and the refractive index $\eta_2$ of lower cladding layer 110. The refractive index $\eta_4$ of the defects 107 can be greater than, equal to, or less than the refractive index $\eta_1$ of waveguiding layer 104, provided only that it is different than that of the surrounding material in the subwavelength resonant grating layer 106.

Optionally, the subwavelength periodic grating layer 106 can be integral with the waveguiding layer 104, i.e., the waveguiding layer 104 can itself contain patterns of a differently-indexed material that form subwavelength resonant gratings. Of course, for embodiments in which the subwavelength resonant grating layer 106 is indeed separate from the waveguiding layer 104, as in the example of FIG. 1A, the bulk of the subwavelength resonant grating layer 106 should have a refractive index lower than that of the waveguiding layer 104. This is because the waveguiding layer 104 needs to have a higher refractive index than nearby non-waveguiding layers, or else the lateral modes would be captured by those nearby layers, in which case those nearby layers would become waveguiding layers and the layer 104 would no longer be a waveguiding layer.

Among many other examples, materials that may be suitable for the waveguiding layer 104 include, but are not limited to, relatively high-index materials such as Si ($\eta$=3.42), InP ($\eta$=3.1), GaAs ($\eta$=3.3), and SiN/Si$_3$N ($\eta$=2.2). Other examples include, but are not limited to, Group IV materials (e.g., Si, Ge, SiC), Group III-V materials (e.g., GaN, GaP, InP, InAs, AlN), and Group II-VI materials (e.g., ZnO, CdS), as well as any of the nonlinear materials described below with respect to the embodiments of FIGS. 5-7. Among many other examples, materials that may be suitable for the upper/lower cladding layers 108/110 include, but are not limited to, relatively low-index materials such as air, vacuum, water (1.35), SiO ($\eta$=1.44), poly-dimethyl siloxane (PDMS, $\eta$=1.4), poly-methyl methacrylate (PMMA, $\eta$=1.49), and quartz glass ($\eta$=1.44).

The grating structure embodied in the subwavelength resonant grating layer 106 can comprise any of a variety of periodic patterns known to facilitate GMR filter functionality, with such periodic patterns usually having a spatial period ˆ in at least one dimension that is less than the wavelength of the incident radiation IN. When so patterned, as a result of a coupling process between the incident radiation IN and lateral radiation modes guided along the waveguiding layer 104, the optical device 100 reflects the zero-order diffracted plane wave in a narrow band of frequencies around a peak reflection frequency. The particular value of the peak reflection frequency, the width of the reflection band, and other spectral characteristics are dependent upon the various layer thicknesses and refractive indices, along with the grating pattern and the defect materials used. The value of the peak reflection frequency can also vary with the sine of the angle at which the incident radiation impinges upon the WGS 102.

Sideband or out-of-band behavior of a GMR filter refers generally to its transmissivity characteristics outside the reflection band. One or more of the embodiments herein is directed to achieving a GMR filter with a very high and flat (low loss and non-distorting) transmittance characteristic for out-of-band radiation frequencies. According to an embodiment, the thickness $T_{WG}$ of the waveguiding layer 104 is less than one tenth of a free space wavelength of the incident radiation at the peak reflection frequency divided by its refractive index. By way of numerical example, if the waveguiding layer comprises SiN/Si$_3$N ($\eta$=2.2) and the incident radiation is at a free-space wavelength of 1530 nm, the thickness $T_{WG}$ of the waveguiding layer 104 should be less than about 70 nm. According to another embodiment, the thickness $T_{WG}$ of the waveguiding layer 104 is less than one fiftieth of a free space wavelength of the incident radiation at the peak reflection frequency divided by its refractive index.

Even though it is very thin, the waveguiding layer 104 can still provide guidance for a lateral propagation mode therealong because its refractive index is higher than that of the surrounding cladding materials. Moreover, because the narrowband reflectivity of the device is brought about by grating-induced resonance effects and interference phenomena involving the laterally propagating modes, the thinness of the waveguiding layer 104 does not preclude the WGS 102 from having a peak reflection frequency at which a very high percentage, even approaching 100 percent, of the incident radiation is reflected upward. Advantageously, at the same, the deep-subwavelength thinness of the waveguiding layer 104, and the concordant thinness of the WGS 102, results in a substantial "invisibility" to all other radiation frequencies, which pass through the WGS 102 with little or no attenuation whatsoever. A very high and flat (low loss and non-distorting) transmittance characteristic for out-of-band radiation frequencies is thereby provided, the out-of-band radiation signals passing through substantially unattenuated. This is to be contrasted against less optimal results associated with thicker waveguiding layers which, due to undesirable phenomena including vertical cavity effects brought about the thicker layers, can bring about uneven and comparatively broad "ringing" of the transmissivity characteristic outside the reflection band, lower transmissivity levels away from the reflection band, or both. The deep-subwavelength thinness of the waveguiding layer, and the concordant thinness of the waveguide grating structure, also facilitates high bit-rate performance for cases in which the optical device 100 is adapted for use in an all-optical modulator in accordance with one or more of the embodiments described infra.

In optional embodiments in which there are multiple waveguiding layers, a cumulative thickness of the waveguiding layers (i.e., the sum of their thicknesses) is preferably less than one tenth of the free space wavelength of the incident radiation at the peak reflection frequency divided by their average refractive index. In other embodiments, the cumulative thickness is less than one-fiftieth of the free space wavelength of the incident radiation at the peak reflection frequency divided by their average refractive index.

Figure 1B:
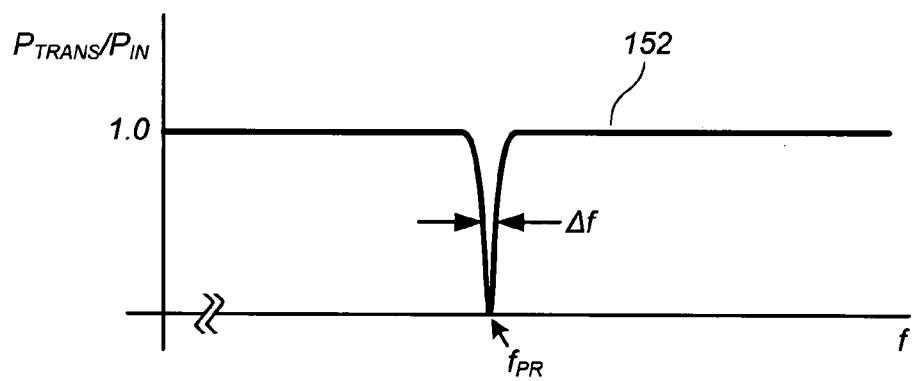
FIG. 1B illustrates a spectral plot of a ratio of transmitted radiation power to incident radiation power for the optical device of FIG. 1A.

FIG. 1B illustrates a spectral plot 152 of a ratio of transmitted radiation power $P_{TRANS}$ to incident radiation power $P_{IN}$ for the optical device 100 of FIG. 1A. Desired values for the peak reflectance frequency $f_{PR}$ and a full width at half maximum (FWHM) bandwidth $\Delta f$ can be achieved by appropriate selection of materials and design parameters as would be achievable by a person skilled in the art in view of the present disclosure. For optical GMR filters having deep-subwavelength waveguiding layer thicknesses and concordantly thin waveguide grating structures according to one or more of the embodiments, a rough rule of thumb useful at the outset of device design is that the overall width of the waveguide grating structure (the overall left-to-right dimension of WGS 102 of FIG. 1A) should be sufficient to include "Q" lateral defect periods ^, where Q is the desired quality factor equal to $f_{PR}/\Delta f$. Generally speaking, a design compromise that may be brought about for optical GMR filters having deep-subwavelength waveguiding layer thicknesses and concordantly thin waveguide grating structures relates to the overall width of the waveguide grating structure which, roughly and generally speaking, may need to increase as those thicknesses decrease to maintain a particular Q value. However, there are many practical applications where the benefits of "invisibility" for out-of-band frequencies outweighs the disadvantages, if any, of increased overall width of the waveguide grating structure.

Figure 2:
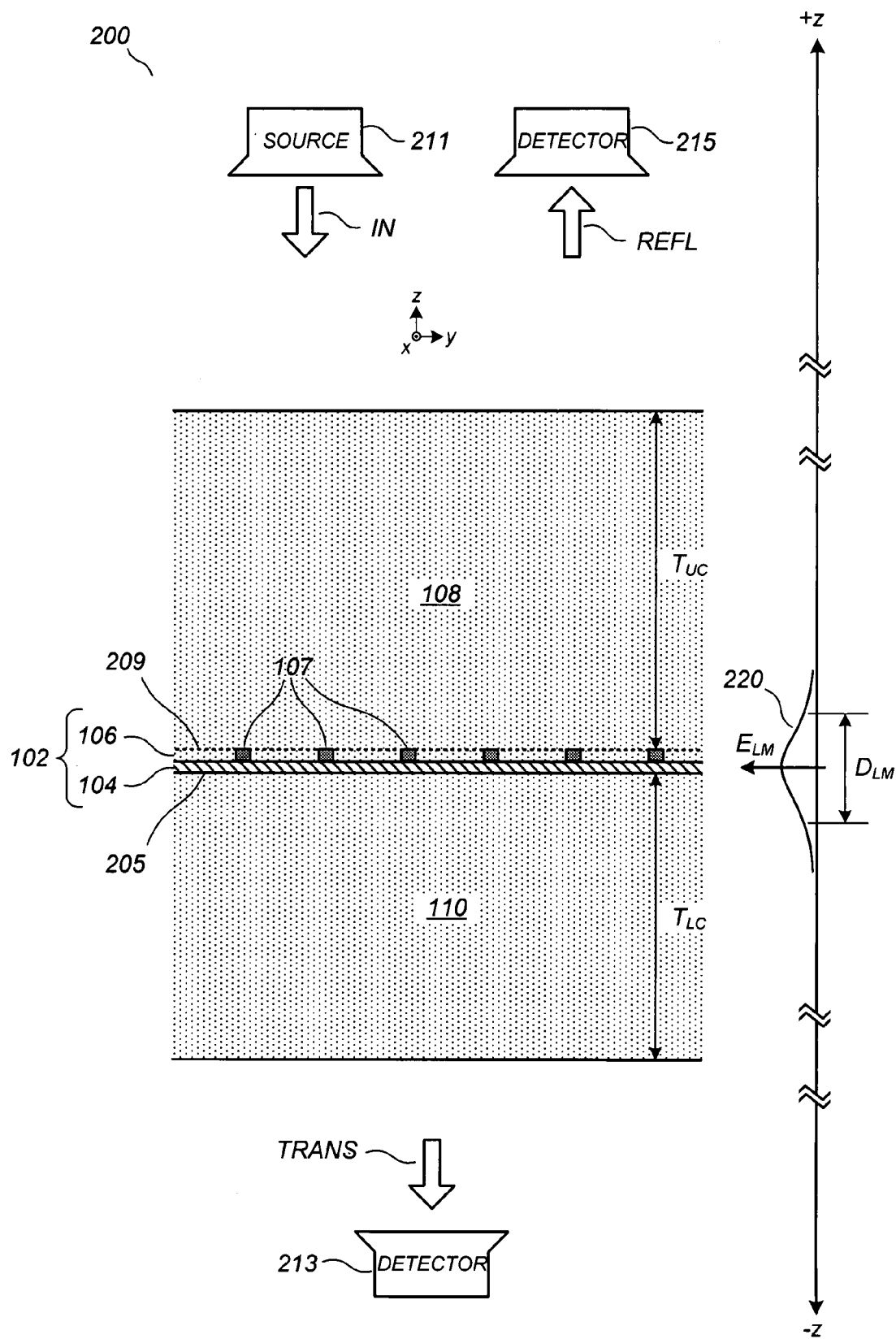
FIG. 2 illustrates a side view of an optical device according to an embodiment.

FIG. 2 illustrates a side view of an optical device 200 according to an embodiment, which includes the optical device of FIG. 1A together with additional components including an optical source 211 for providing the incident radiation IN, a first optical detector 213 for receiving the transmitted radiation TRANS, and a second optical detector 215 for receiving the reflected radiation REFL. Depending on the particular application, a particular overall device may include only one or the other of the optical detectors 213 and 215. Although the incident, transmitted, and reflected beams are illustrated as being strictly vertical in the example of FIG. 2 and other examples herein, it is to be appreciated that they may be at various different non-horizontal angles without departing from the scope of the embodiments.

Associated with the subwavelength periodic grating layer 106 is an upper surface that defines an upper surface 209 of the WGS 102. Associated with the waveguiding layer 104 is a lower surface that defines a lower surface 205 of the WGS 102. The upper cladding layer 108 extends immediately from the upper surface 209 of WGS 102 toward the optical source 211. In one embodiment, the upper cladding layer 108 has a thickness $T_{UC}$ that is very large, much larger than both the wavelength of the incident radiation IN and the various vertical dimensions of the WGS 102. More specifically, the thickness $T_{UC}$ is sufficiently large such that all of the meaningful electromagnetic interactions brought about by the WGS 102, for which the upper cladding layer 108 actually serves as a cladding, occur well below its upper surface. Stated another way, for this embodiment, any radiation propagating into or out of the upper surface of the upper cladding layer 108 is located outside the range of effect of the WGS 102. By way of example, shown in FIG. 2 is a plot 220 of an electric field strength of a laterally propagating mode guided by the waveguiding layer 104. One metric of the range of effect of the WGS 102 is a vertical extent $D_{LM}$ of the laterally propagating mode that may correspond, for example, to a FWHM distance. Generally speaking, the vertical extent $D_{LM}$ of the laterally propagating mode will be proportional to a square of the free space wavelength of the incident radiation IN divided by the thickness $T_{WG}$ of the waveguiding layer 104. Accordingly, for one embodiment, the thickness $T_{UC}$ of the upper cladding layer 108 is greater than square of the free space wavelength of the incident radiation IN divided by the thickness $T_{WG}$ of the waveguiding layer 104.

In the event that the upper cladding layer 108 simply consists of air or a vacuum, the upper cladding layer 108 does not have an upper surface per se. In such cases, the upper cladding layer 108 is actually more of a spatial buffer layer, and it is simply required for one embodiment that nothing but air or vacuum is contained within that buffer layer for a distance of $T_{UC}$ above the upper surface 209 of the WGS 102. In the event that upper cladding layer 108 does comprise a solid material such as glass, which may be desirable for physical integrity of the overall device in view of the thinness of the WGS 102, an optional antireflective coating may be provided on its upper surface.

Generally speaking, the features and limitations for the upper cladding layer 108 are also applicable for the lower cladding layer 110, although it is not necessarily required that the upper and lower cladding layers be symmetric with each other. Accordingly, for one embodiment, the thickness $T_{LC}$ of the lower cladding layer 110 is greater than square of the free space wavelength of the incident radiation IN divided by the thickness $T_{WG}$ of the waveguiding layer 104. Likewise, if the lower cladding layer 110 simply consists of air or a vacuum, then for one embodiment nothing but air or vacuum is contained within that buffer layer for a distance of $T_{LC}$ below the lower surface 205 of the WGS 102.

In other embodiments, one or both of the thicknesses $T_{UC}$ and $T_{LC}$ can be less than the vertical extent $D_{LM}$ of the laterally propagating mode and/or less than the free space wavelength of the incident radiation IN divided by the thickness $T_{WG}$ of the waveguiding layer 104. In such embodiments, computer modeling and characterization of the optical device 100 may be more complex due to interactions among the upper/lower surfaces of the cladding layers 108/110 and the laterally guided modes. However, one or more of the advantages associated with the deep-subwavelength thinness of the waveguiding layer and concordant thinness of the waveguide grating structure should still be substantially present where one or both of the cladding layers 108/110 are of such reduced thickness dimension.

Figure 3:
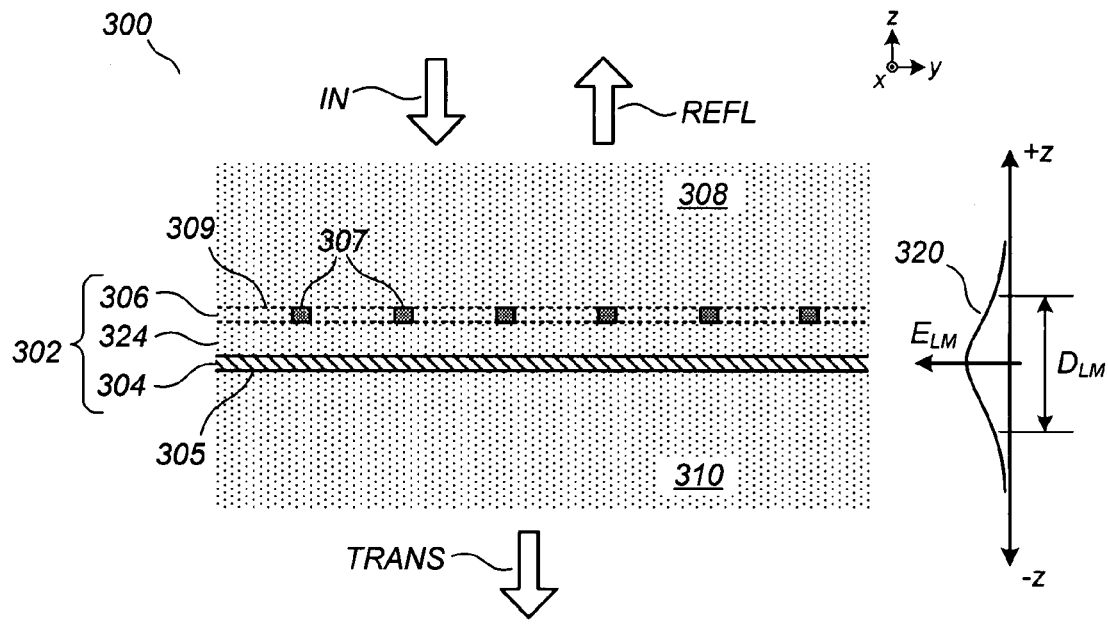
FIG. 3 illustrates a side view of an optical device according to an embodiment.

FIG. 3 illustrates a side view of an optical device 300 according to an embodiment. Optical device 300 comprises a waveguide grating structure (WGS) 302, which comprises a subwavelength periodic grating layer 306 and a waveguiding layer 304 respectively similar to subwavelength periodic grating layer 106 and waveguiding layer 104 of FIGS. 1-2, supra, except that the WGS 302 further comprises an internal cladding layer 324 disposed between the subwavelength periodic grating layer 306 and the waveguiding layer 304, the internal cladding layer 324 having an index of refraction lower than that of the waveguiding layer 304. An upper surface of the subwavelength periodic grating layer 306 defines an upper surface 309 of the WGS 302. A lower surface of the waveguiding layer 304 defines a lower surface 305 of the WGS 302.

For one embodiment, an upper cladding layer 308 extends upward immediately from the upper WGS surface 309 by a large distance relative to the range of influence of the modes laterally propagating along the waveguiding layer 304, as described supra with respect to upper cladding layer 108 of FIGS. 1-2. Likewise, a lower cladding layer 310 extends downward immediately from the lower WGS surface 305 at least by that large distance. For another embodiment, the thicknesses of the upper cladding layer 308 and lower cladding layer 310 can be of lesser dimension.

Reasons for separating the subwavelength periodic grating layer 306 from the waveguiding layer 304 can include manufacturability concerns and/or accommodation of a wider variety of materials. This is especially advantageous if one or more of the materials is to be optically modulable according to one or more the embodiments of FIGS. 5-7, infra. GMR filter functionality can be achieved despite the separation provided that the subwavelength periodic grating layer 306 lies within a vertical extent $D_{LM}$ of a mode profile 320 of lateral modes guided along the waveguiding layer 304. Equivalently, according to an embodiment, the upper surface 309 and lower surface 305 of the WGS 302 are separated by less than the vertical extent $D_{LM}$ of the mode profile 320. Although illustrated as comprising the same material as the upper and lower cladding layers 308/310, the internal cladding layer 324 can comprise a different material than the upper and lower cladding layers 308/310 provided that its index of refraction is lower than that of the waveguiding layer 304.

Figure 4:
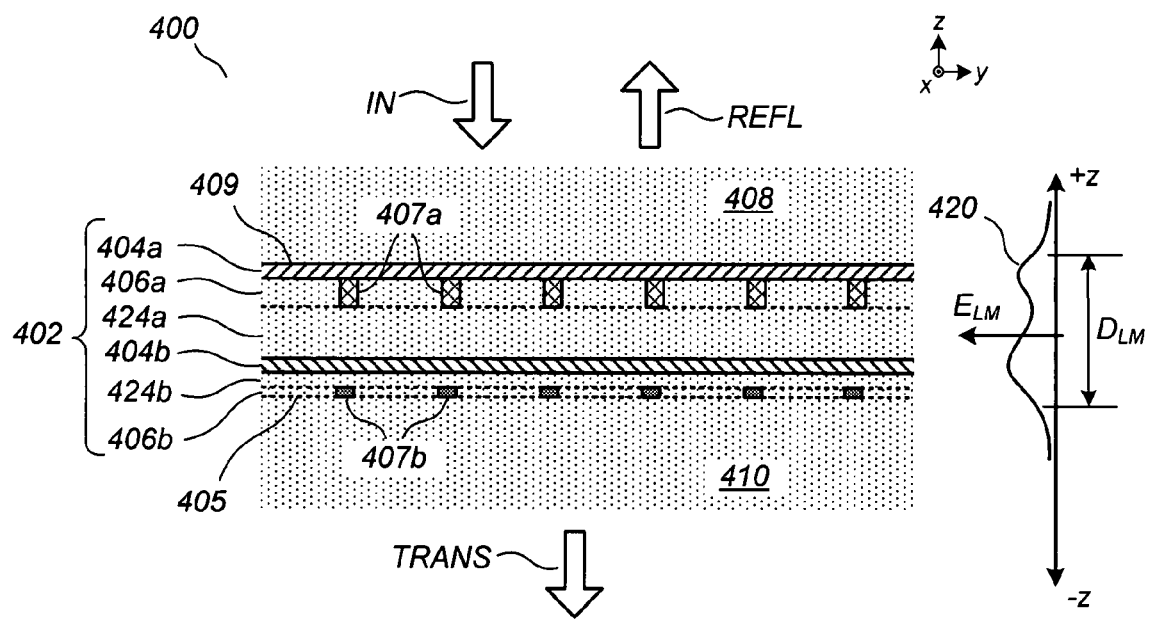
FIG. 4 illustrates a side view of an optical device according to an embodiment.

FIG. 4 illustrates a side view of an optical device 400 according to an embodiment. Optical device 400 comprises a waveguide grating structure (WGS) 402, which in turn comprises plural subwavelength periodic grating layers 406a and 406b including defects 407a and 407b, plural waveguiding layers 404a and 404b, and plural internal cladding layers 424a and 424b disposed thereamong as shown. Upper and lower surfaces 409 and 405 of the WGS 402 are defined respectively by uppermost and lowermost ones of the waveguiding and subwavelength periodic grating layers.

For one embodiment, an upper cladding layer 408 extends upward immediately from the upper WGS surface 409 by a large distance relative to the range of influence of the modes laterally propagating along the waveguiding layers 404a and 404b. Likewise, a lower cladding layer 410 extends downward immediately from the lower WGS surface 405 at least by that large distance. For another embodiment, the thicknesses of the upper cladding layer 408 and lower cladding layer 410 can be of lesser dimension.

Each of the upper and lower cladding layers 408 and 410 has an index of refraction that is lower than a lowest-index one of the waveguiding layers 404a and 404b. The upper surface 409 and lower surface 405 of the WGS 402 are separated by less than a vertical extent $D_{LM}$ of a mode profile 420 of laterally propagating modes guided by the waveguiding layers 404a and 404b. Although illustrated as comprising the same material as the upper and lower cladding layers 408/410, the internal cladding layers 424a and 424b can comprise a different material than the upper and lower cladding layers 408/410 provided that their refractive indices are each lower than a lowest-index one of the waveguiding layers 404a and 404b.

Figure 5:
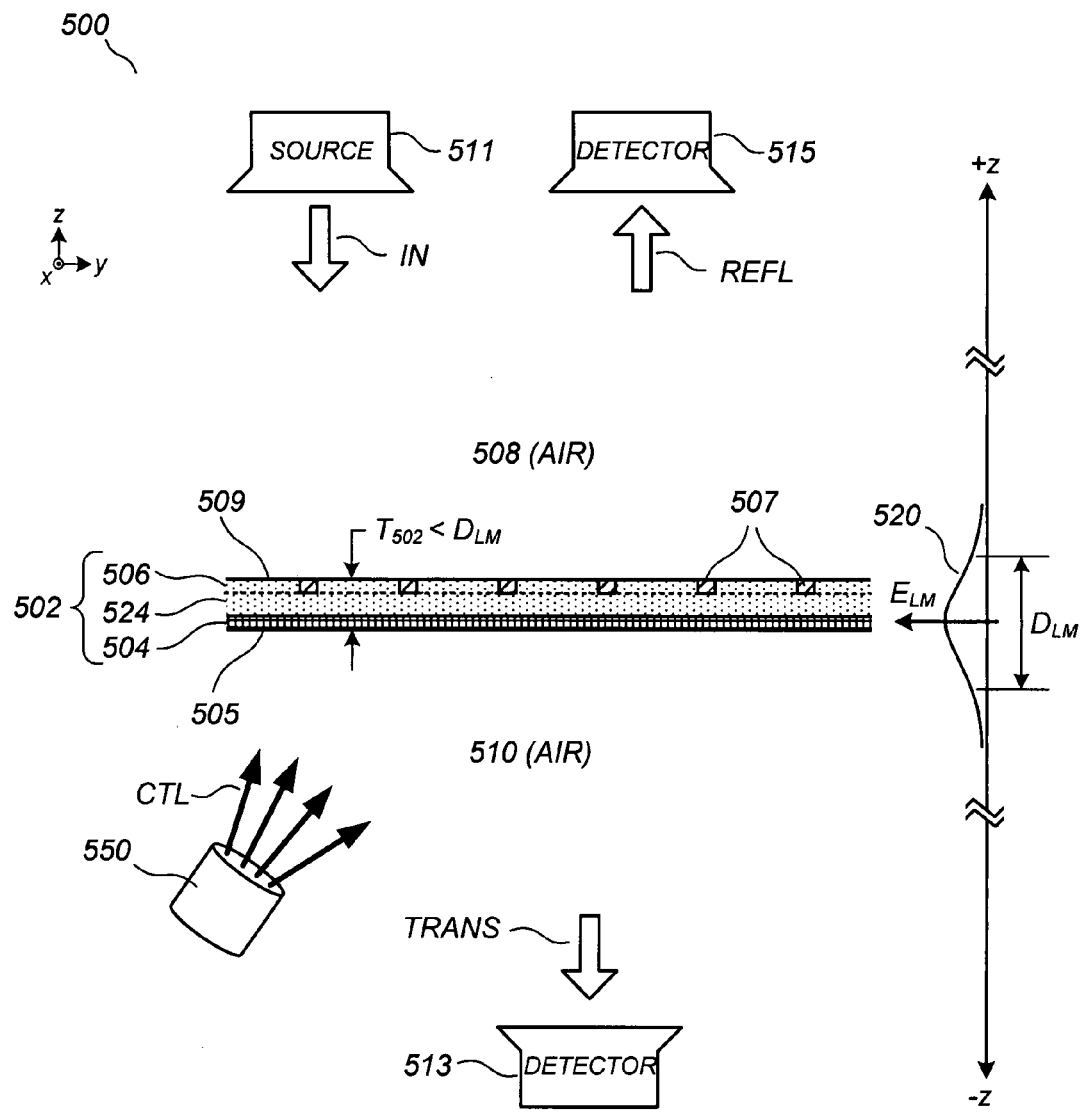
FIG. 5 illustrates a side view of an optical device according to an embodiment.

FIG. 5 illustrates a side view of an optical device 500 for modulating an optical signal according to an embodiment. Optical device 500 comprises a horizontal waveguide grating structure (WGS) 502, an optical source 511 for providing incident radiation IN, a first optical detector 513 for receiving transmitted radiation TRANS, and a second optical detector 515 for receiving reflected radiation REFL. WGS 502 comprises a subwavelength periodic grating layer 506, an internal cladding layer 524, and a waveguide layer 504 respectively similar in structure and function to the subwavelength periodic grating layer 306, internal cladding layer 324, and a waveguide layer 304 of the WGS 302 of FIG. 3, supra, except that at least one material of the WGS 502 has a refractive index that is dynamically modulable according to an applied optical modulation beam. Optical device 500 further comprises an optical modulation source 550 coupled to provide an optical modulation beam CTL to the optically tunable refractive index material, whereby the optical device 500 optically modulates the incident radiation IN to produce complementary modulated signals TRANS and REFL. For one embodiment, upper and lower cladding layers 508 and 510, which comprise air in this example, extend upward and downward, respectively, from an upper surface 509 of the WGS 502 and a lower surface 505 of the WGS 502, respectively, by the buffering distances described supra with respect to FIG. 1A.

Figure 6:
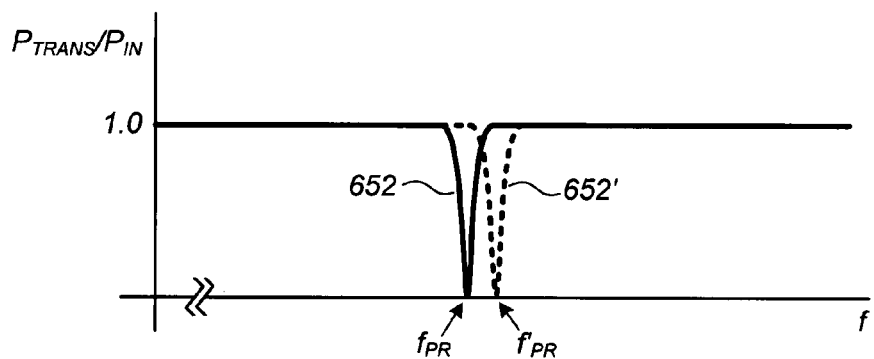
FIG. 6 illustrates spectral plots of a ratio of transmitted radiation power to incident radiation power for different control beam states for the optical device of FIG. 5.

FIG. 6 illustrates spectral plot 652 and 652' of a ratio of transmitted radiation power $P_{TRANS}$ to incident radiation power $P_{IN}$ for the optical device 500 of FIG. 5 when the modulation signal CTL is at in OFF level and an ON level, respectively. Accordingly, if the incident optical signal IN is monochromatic at a frequency of $f_{PR}$, there will be close to zero percent of its radiation received at the first detector 513 when CTL is OFF, and there will be close to 100 percent of its radiation received at the first detector 513 when CTL is ON.

The material that is optically modulable can be disposed in one or more of the waveguiding layer 504, the bulk material of the subwavelength periodic grating layer 506, the defect material 507, and the internal cladding layer 524. Suitable optically modulable materials include any of a variety of inorganic and organic materials having an index of refraction that can vary with the intensity of an applied optical modulation beam including, among many other examples, lithium niobate ($LiNbO_3$), lithium tantalate ($LiTaO_3$), barium-sodium niobate (BSN), ammonium dihydrogen phosphate (ADP), potassium dihydrogen phosphate (KDP), potassium titanyl phosphate (KTP), rubidium titanyl arsenate (RTA), rubidium titanyl phosphate (RTP), bacteriorhodopsin (BR), dimethylamino-methyl stilbazolium tosylate (DAST), and semiconductor materials such as GaAs, CdTe, ZnS-cubic, CdZnTe or ZnTe. Advantageously, because of the relatively high sensitivity of the peak reflection frequency to the parameters of the WGS 502, a material can be effective as the optically modulable material even if its response to the applied optical modulation beam is relatively weak. Similarly, a material having a strong response to the applied optical modulation beam can be driven in a relatively low range of refractive index variations. An overall capability for very fast modulation rates, even into the hundreds of GHz for appropriately chosen materials, can thereby be achieved by an optical device according to one or more of the embodiments. Lithium niobate represents one particularly suitable solution for the optically modulable material, not only because of its very fast response time, but also because of a relatively mature device fabrication and processing technology that has been built up around lithium niobate.

Figure 7:
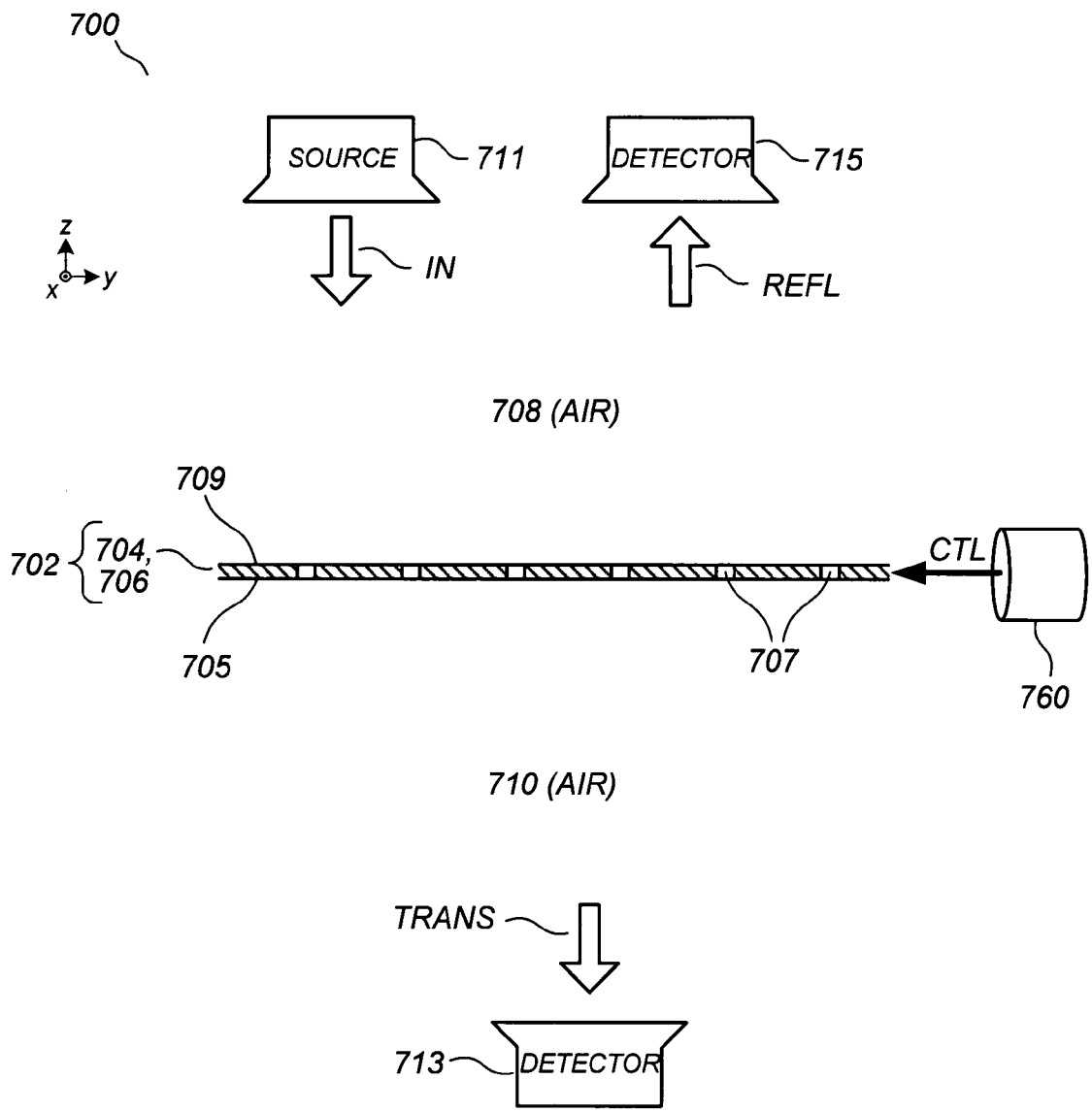
FIG. 7 illustrates a side view of an optical device according to an embodiment.

FIG. 7 illustrates an optical device 700 for modulating an optical signal according to an embodiment. Optical device 700 comprises a horizontal waveguide grating structure (WGS) 702, an optical source 711 for providing incident radiation IN, a first optical detector 713 for receiving transmitted radiation TRANS, and a second optical detector 715 for receiving reflected radiation REFL. WGS 702 comprises a waveguiding layer 704 comprising lithium niobate, and a subwavelength periodic grating layer 706 that is integral therewith in the form of air hole defects 707. For one embodiment, upper and lower air cladding layers 708 and 710 extend upward and downward, respectively, from an upper surface 709 of the WGS 702 and a lower surface 705 of the WGS 702, respectively, by a distance sufficient to ensure buffer regions similar to the air buffers described supra with respect to FIG. 1A.

Optical device 700 further comprises an optical modulation source 760 coupled to provide an optical modulation beam CTL to the lithium niobate material of the waveguiding layer 704, whereby the optical device 700 optically modulates the incident radiation IN to produce complementary modulated signals TRANS and REFL. However, in contrast to the optical modulation source 550 of FIG. 5, which bathes the WGS 502 from below (or above), the optical modulation source 760 introduces the optical modulation radiation along an edge of the lithium niobate slab. Advantageously, because modulation requires only modest perturbations of the peak resonant frequency, it is not required that the control radiation be applied in a strictly uniform manner across the lithium niobate slab.

Fabrication of optical devices according to one or more of the embodiments can be achieved using known fabrication methods including, but not limited to: deposition methods such as chemical vapor deposition (CVD), metal-organic CVD (MOCVD), plasma enhanced CVD (PECVD), chemical solution deposition (CSD), sol-gel based CSD, metal-organic decomposition (MOD), Langmuir-Blodgett (LB) techniques, thermal evaporation/molecular beam epitaxy (MBE), sputtering (DC, magnetron, RF), and pulsed laser deposition (PLD); lithographic methods such as optical lithography, extreme ultraviolet (EUV) lithography, x-ray lithography, electron beam lithography, focused ion beam (FIB) lithography, and nanoimprint lithography; removal methods such as wet etching (isotropic, anisotropic), dry etching, reactive ion etching (RIE), ion beam etching (IBE), reactive IBE (RIBE), chemical-assisted IBE (CAIBE), and chemical-mechanical polishing (CMP); modifying methods such as radiative treatment, thermal annealing, ion beam treatment, and mechanical modification; and assembly methods such as wafer bonding, surface mount, and other wiring and bonding methods.

Whereas many alterations and modifications of the embodiments will no doubt become apparent to a person of ordinary skill in the art after having read the foregoing description, it is to be understood that the particular embodiments shown and described by way of illustration are in no way intended to be considered limiting. By way of example, although described in one or more embodiments supra as being applicable to optical signals, filters and/or modulators according to one or more of the embodiments can be applied for other frequencies of electromagnetic radiation, such as frequencies within the microwave regime, without departing from the scope of the present teachings. Thus, reference to the details of the described embodiments are not intended to limit their scope.

What is claimed is:

1. An optical device, comprising:
   a horizontal waveguide grating structure (WGS) comprising at least one waveguiding layer and at least one subwavelength periodic grating layer; and
   upper and lower cladding layers immediately adjoining respective upper and lower surfaces of said WGS and having refractive indices lower than a lowest-index one of said waveguiding layers, incident radiation propagating through one of said upper and lower cladding layers toward said WGS;
   wherein said WGS is configured for peak reflection of said incident radiation at a peak reflection frequency; and
   wherein a cumulative thickness of said waveguiding layers is less than one tenth of a free space wavelength of the incident radiation at said peak reflection frequency divided by an average refractive index of said waveguiding layers.

2. The optical device of claim 1, each of said upper and lower cladding layers having a thickness greater than a square of said free space wavelength of said incident radiation at said peak reflection frequency divided by said cumulative thickness, said WGS exhibiting a reflection band that includes said peak reflection frequency, whereby incident radiation at any frequency outside said reflection band passes through said WGS substantially unattenuated.

3. The optical device of claim 2, wherein each of said upper and lower cladding layers comprises one of air and a vacuum, wherein said at least one waveguiding layer consists of a single waveguiding layer, and wherein said subwavelength periodic grating layer is integral with said single waveguiding layer and formed by through-holes patterned therein.

4. The optical device of claim 2, a lateral propagation mode having a vertically extending mode profile being guided along said at least one waveguiding layer for incident radiation within said reflection band, wherein said upper and lower surfaces of said WGS are separated by less than a vertical extent of said lateral propagation mode profile, said upper and lower surfaces of said WGS being defined respectively by uppermost and lowermost ones of said waveguiding and subwavelength periodic grating layers.

5. The optical device of claim 1, wherein said WGS comprises a dynamically tunable refractive index material such that said peak reflection frequency is dynamically tunable.

6. The optical device of claim 5, wherein said dynamically tunable refractive index material is an optically tunable refractive index material, and wherein said optical device further comprises an optical modulation source coupled to provide an optical modulation beam to said optically tunable refractive index material, whereby said optical device optically modulates said incident radiation according to said optical modulation beam.

7. The optical device of claim 6, wherein said optical modulation beam is applied to said optically tunable refractive index material from one of edgewise direction, an upper direction, and a lower direction.

8. The optical device of claim 6, said upper and lower surfaces of said WGS being defined respectively by uppermost and lowermost ones of said waveguiding and subwavelength periodic grating layers, a lateral propagation mode having a vertically extending mode profile being guided along said at least one waveguiding layer for incident radiation within a reflection band near said peak reflection frequency, wherein said upper and lower surfaces of said WGS are separated by less than a vertical extent of said lateral propagation mode profile, and wherein each of said upper and lower cladding layers has a thickness greater than a square of said free space wavelength of said incident radiation at said peak reflection frequency divided by said cumulative thickness of said waveguiding layers.

9. The optical device of claim 5, said upper and lower surfaces of said WGS being defined respectively by uppermost and lowermost ones of said waveguiding and subwavelength periodic grating layers, said WGS comprising at least one internal cladding layer disposed among said at least one waveguiding layer and said at least one subwavelength resonant grating layer, wherein said dynamically tunable refractive index material is incorporated into (a) said at least one waveguiding layer, (b) said at least one subwavelength resonant grating layer, or (c) said at least one internal cladding layer.

10. The optical device of claim 9, a lateral propagation mode having a vertically extending mode profile being guided along said at least one waveguiding layer for incident radiation within a reflection band near said peak reflection frequency, wherein said upper and lower surfaces of said WGS are separated by less than a vertical extent of said lateral propagation mode profile, and wherein each of said upper and lower cladding layers has a thickness greater than a square of said free space wavelength of said incident radiation at said peak reflection frequency divided by said cumulative thickness of said waveguiding layers.

11. A method, comprising:
causing an optical apparatus to be positioned in the path of incident electromagnetic radiation, the optical apparatus comprising a horizontal waveguide grating structure (WGS) having at least one waveguiding layer and at least one subwavelength periodic grating layer, the optical apparatus further having upper and lower cladding layers immediately adjoining respective upper and lower surfaces of the WGS and having refractive indices lower than a lowest-index one of the waveguiding layers, wherein the incident radiation propagates in a generally downward direction toward the WGS through the upper cladding layer; and
receiving one of radiation reflected upwardly from the WGS through the upper cladding layer and radiation propagated downwardly through the WGS and the lower cladding layer;
wherein the WGS is configured for peak upward reflection of the incident radiation at a peak reflection frequency; and
wherein a cumulative thickness of the waveguiding layers is less than one tenth of a free space wavelength of the incident radiation at the peak reflection frequency divided by an average refractive index of the waveguiding layers.

12. The method of claim 11, the WGS comprising a dynamically tunable refractive index material such that said peak reflection frequency is correspondingly dynamically tunable, the method further comprising applying an external modulation signal to the dynamically tunable refractive index material to modulate the incident radiation.

13. The method of claim 12, wherein the dynamically tunable refractive index material is an optically tunable refractive index material, and wherein said applying an external modulation signal comprises applying an optical modulation beam to the optically tunable refractive index material.

14. The method of claim 13, wherein the optical modulation beam is applied to the optically tunable refractive index material from one of edgewise direction, an upper direction, and a lower direction.

15. The method of claim 11, each of the upper and lower cladding layers having a thickness greater than a square of the free space wavelength of the incident radiation at the peak reflection frequency divided by the cumulative thickness of the waveguiding layers, the WGS exhibiting a reflection band that includes the peak reflection frequency, whereby incident radiation at any frequency outside the reflection band passes through the WGS substantially unattenuated.

16. The optical device of claim 15, wherein each of the upper and lower cladding layers comprises air, wherein the at least one waveguiding layer consists of a single lithium niobate waveguiding layer, and wherein the subwavelength periodic grating layer is integral with the single lithium niobate waveguiding layer and formed by air holes patterned therein.

17. The optical device of claim 11, wherein said cumulative thickness of the waveguiding layers is less than one fiftieth of the free space wavelength of the incident radiation at the peak reflection frequency divided by the average refractive index of the waveguiding layers.

18. An apparatus, comprising:
a optical source providing a source beam;
a horizontal waveguide grating structure comprising at least one waveguiding layer and at least one subwavelength periodic grating layer, said waveguide grating structure having upper and lower surfaces defined by an uppermost one and a lowermost one of said waveguiding and subwavelength periodic grating layers, respectively, said waveguide grating structure being disposed beneath said optical source;
upper and lower cladding layers extending upward from said upper surface and downward from said lower surface, respectively, said upper and lower cladding layers having refractive indices lower than a lowest-index one of said waveguiding layers, said upper cladding layer being disposed beneath said optical source;
an optical receiver positioned to receive one of radiation reflected upwardly from the WGS through the upper cladding layer and radiation propagated downwardly through the WGS and the lower cladding layer;
wherein said WGS is configured for peak reflection of said source beam at a peak reflection frequency; and
wherein a cumulative thickness of said waveguiding layers is less than one tenth of a free space wavelength of the source beam at said peak reflection frequency divided by an average refractive index of said waveguiding layers.

19. The apparatus of claim 18, further comprising means for externally controlling a refractive index of at least one material layer of said waveguide grating structure, whereby said optical receiver receives a version of said source beam as modulated according to said external control.

20. The apparatus of claim 19, wherein said means for externally controlling comprises means for optically modulating said refractive index of said at least one material layer of said waveguide grating structure.

* * * * *